United States Patent [19]

Stanton

[11] Patent Number: 4,526,225
[45] Date of Patent: Jul. 2, 1985

[54] BUILDING ELEMENT FOR HEAT STORAGE AND TRANSFER

[76] Inventor: Austin N. Stanton, 3017-15 Stonehenge La., Carrollton, Tex. 75006

[21] Appl. No.: 552,399

[22] Filed: Nov. 16, 1983

Related U.S. Application Data

[63] Continuation of Ser. No. 306,313, Sep. 28, 1981, abandoned.

[51] Int. Cl.³ .............................................. F28D 13/00
[52] U.S. Cl. ........................... 165/104.11 A; 126/400; 165/53; 165/101
[58] Field of Search .............. 126/400, 430, 431, 436; 165/48.5, 53, 101, 104.11 A

[56] References Cited

U.S. PATENT DOCUMENTS

| | | | |
|---|---|---|---|
| 3,980,130 | 9/1976 | Thomason et al. | 126/435 X |
| 4,180,350 | 1/1980 | Staudacher | 126/430 |
| 4,231,351 | 11/1980 | Pheils, Jr. | 126/427 X |
| 4,250,871 | 2/1981 | Milburn, Jr. | 165/104.11 X |
| 4,257,481 | 3/1981 | Dobson | 126/436 X |
| 4,286,575 | 9/1981 | Gates | 126/430 X |
| 4,303,058 | 12/1981 | Chun | 126/430 |
| 4,324,289 | 4/1982 | Lahti | 126/430 X |
| 4,338,918 | 7/1982 | Milburn, Jr. | 126/435 X |
| 4,350,200 | 9/1982 | McElwain | 126/430 X |

FOREIGN PATENT DOCUMENTS

| | | | |
|---|---|---|---|
| 28800 | 5/1981 | European Pat. Off. | 126/431 |
| 49669 | 4/1982 | European Pat. Off. | 126/430 |
| 2322260 | 11/1974 | Fed. Rep. of Germany | 165/53 |

*Primary Examiner*—Stephen F. Husar

[57] ABSTRACT

Structures fabricated from modules of permeable concrete provide heat storage and transfer capability. Such structures derive solar energy directly, store it within the modules for future use in a building, or it can withdraw heat from a building and dispose of it to the sky with little utility derived energy. After erection without mortar both surfaces are coated with fiber filled mastic for strength and to enclose an air circulation system. Each module has a central bin filled with gravel and two planar ducts between each end and the central bin. Air injected into the first, from the outside end, duct removes heat from the surface, distributes the heat by uniform transverse flow to warm the gravel and exits through the third duct. Similarly, at useful times, it removes heat from the gravel and warms the interior surface. At other times and by the same process heat is removed from the interior surface and stored; later it is transferred to the exterior surface and radiated into space. Auxiliary sensors, valves, actuators, fans, conduits and a computer are provided for. Under most conditions no energy collection, disposal or storage means external to the modules is required.

2 Claims, 5 Drawing Figures

4,526,225

BUILDING ELEMENT FOR HEAT STORAGE AND TRANSFER

This application is a continuation application of U.S. Ser. No. 06/306,313, filed Sept. 28, 1981, now abandoned.

BACKGROUND OF THE INVENTION

1. Field of the Invention

The present invention lies in the fields of solar energy and of energy conservation in buildings. More particularly it is in the field of heating and air conditioning wherein the building structures and their materials cooperate in a heat pump system operating between the sun as the direct source of energy and the cold of space as the direct sink and wherein a building wall and/or roof collects, disposes of, stores and applies energy on command to maintain predetermined temperatures of the interior environment of the building. The only other energy required is used in small air circulating fans, air valve operators and a simple computer to control the system. No energy collection, disposal or storage means external to the modules is required.

2. Description of the Prior Art

Current studies of energy acquisition, storage, recovery, and disposal generally treat each of these factors as being more or less independent. Many primitive peoples made simple use of all of these factors. The Hopis of Arizona have lived quite comfortably for 800 years, so they say, in their thick walled sandstone homes. Without other energy sources they manage the daily energy input and output of their walls. The thermal capacity and high insulation value of their walls take care of the long term problems.

Heat pumps are quite efficient, depending on the temperature differences between source and sink. Also, in cold weather they depend on direct electrical heating. Only a few other systems have been developed which include direct energy disposal. Solar cells and solar collectors are, at present, much too expensive for common use. Underground homes are both expensive and are depressing to many.

SUMMARY OF THE INVENTION

In cool weather the modules of the present invention store solar derived energy in gravel filled internal bins in concrete walls and/or roofs of buildings, later removing energy from the gravel for heating the interiors of the buildings. In warm weather circulating air removes energy from the gravel during the night by radiating it into space, later removing energy from interior wall and ceiling surfaces and storing it in the gravel. The temperature of outer space is 3 degrees Kelvin. On clear nights leaves and grass lower their temperature in this manner, allowing formation of dew.

The energy management structure herein disclosed offers low cost, solar energy collection and disposal, both short and long term energy storage, while using electrical energy only for circulation of air and for the control thereof. Control of the energy management system is vested in a simple computer.

While it is apparent that the efficiency per unit of area insolated or exposed to outer space may not be large the area so exposed is so large that this deficiency does not materially affect the overall performance of the system.

BRIEF DESCRIPTION OF THE DRAWINGS

The drawings illustrate several views of the structure in several modes, accessories and schematic diagrams of the system.

DETAILED DESCRIPTION OF THE INVENTION

Figure 1:
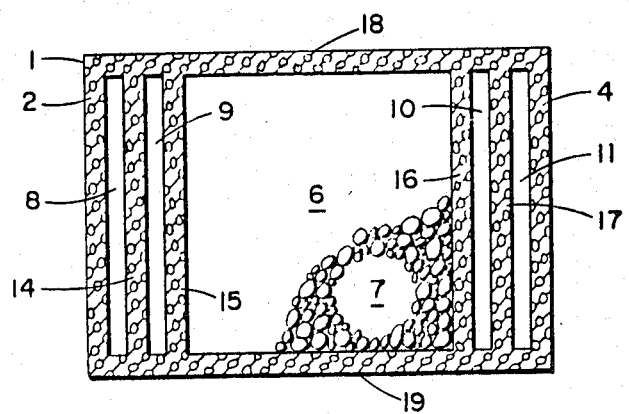
FIG. 1 is a plan view of a single structure module in block, column or beam form.

FIG. 1 is a plan view of a permeable module 1 having uniform cross section as shown. Two planar support elements 18 and 19 extend from the outside surface of a wall to the inside surface of said wall and are parallel to each other. The support elements 18 and 19 support all inner parts of the module 1. Extending between the support elements 18 and 19, and in their order of placement are:

a planar outside element 2,
a duct 8,
a planar septum 14,
a duct 9,
a planar septum 15,
a bin 6,
a planar septum 16,
a duct 10,
a planar septum 17,
a duct 11, and
a planar inside element 4.

The bin 6 is filled, usually after erection, with gravel 7 having a high thermal capacity. Ducts 8 and 9 distribute air which filters through the module, including the gravel 7. This air is withdrawn through ducts 10 and 11, in manners shown hereinafter. Modules are extruded in conventional machines and cured with steam in the usual way. It should be borne in mind that energy can only be transferred from systems of higher temperature to systems of lower temperature.

As shown in FIGS. 2-5 all inside and outside surfaces of wall and roof sections composed of the modules 1 of FIG. 1 are coated, 3 and 3a, with mastic cement filled with long staple glass fiber. This provides ample transverse wall strength without the use of mortar. It also seals the air circulation system against exchange of air with the environment.

Figure 2:
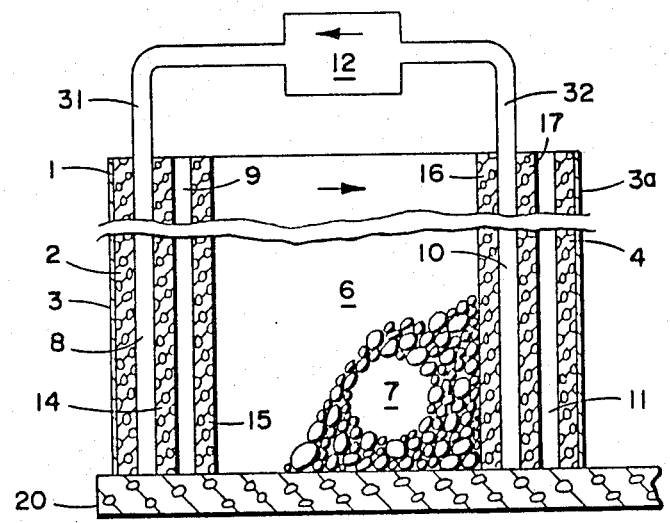
FIG. 2 is a cross section of a wall and a schematic diagram of the air circulation system showing the system as used on a winter day and on a summer night.

FIG. 2 shows a cross section of a wall composed of the modules 1 of FIG. 1 and a schematic air circulation diagram including a fan 12 and ducts 31 and 32 as used on a winter day transferring energy from a sun-warmed outer outside element 2 to the gravel 7. It also shows how energy is transferred on a summer night from the gravel 7 to the outside element 2 from which it is radiated to outer space thus storing cold in the gravel 7. The upper ends of ducts 9 and 11 are closed by blank sections of the slides 62 and 67 of valves 60 and 69 of FIG. 5. Air cannot pass through the inside element 4 because the interior wall surface is sealed by the coating 3a. The septum 17, the stagnant air in duct 11 and the inside element 4 act as insulation to prevent heat or cold from being transferred to the inside element 4 and its coating 3a.

Figure 3:
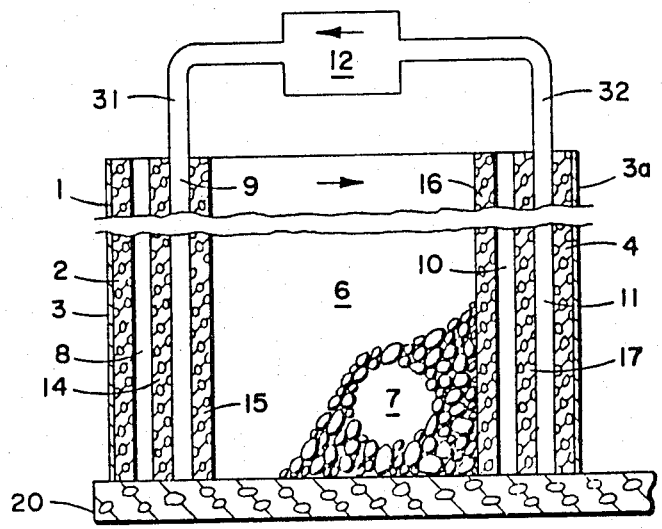
FIG. 3 is a cross section of a wall and a schematic diagram of the air circulation system showing the system as used on a winter night and on a summer day.

FIG. 3 shows a cross section of a wall composed of the modules 1 of FIG. 1 and a schematic air circulation diagram including a fan 12 and ducts 31 and 32. It shows how energy is transferred on a winter night from the gravel 7 to the inside element 4 and its coating 3a from which it is radiated to the inside areas of a building. It also shows how stored cold is transferred on a summer day from the gravel 7 to the inside element 4 and its coating 3a from which it absorbs energy from the inside areas of a building. The upper ends of ducts 8 and 10 are closed by blank sections of the slides 62 and 67 of valves 60 and 69 of FIG. 5. Air cannot pass through the outside element 2 because the exterior wall surface is sealed by the coatings 3. The septum 14, the stagnant air in duct 8 and the outside element 2 act as insulation to prevent heat or cold from being transferred to the outside wall surface 1.

Various sections of the walls of a building may be composed, in any appropriate order, of the modules 1 of FIG. 1. Modules may have matching keys and grooves, and may be grouted together to avoid differential transverse movement.

Figure 4:
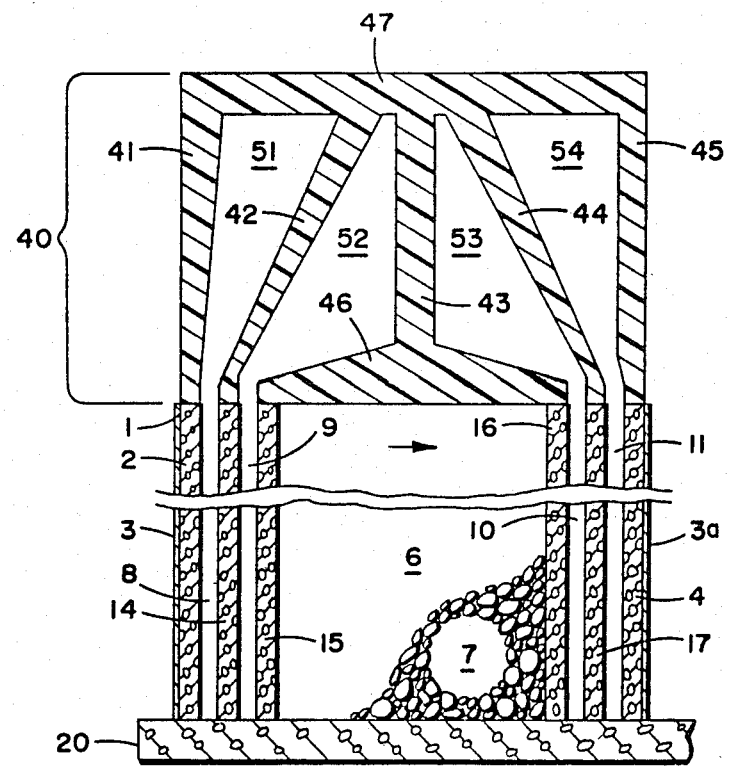
FIG. 4 is a cross section of a wall and of a quadripartite distributive conduit in place on top of a wall.

FIG. 4 is a cross section of a quadripartite distributive conduit 40 in position on top of a wall composed of a one or more modules 1 of FIG. 1. FIG. 4 illustrates the means and manner in which air is distributed to and recovered from the ducts of a wall or roof section composed of modules. The quadripartite conduit 40, through its single channel 51 distributes air uniformly to all of ducts 8 in all parts of a wall or roof section. Channel 52 distributes air to all ducts 9 in all parts of a wall or roof section. Similarly, air is collected from all of ducts 11, by channel 54, and air from all of ducts 10 is collected by channel 53. Conduit 40 has the same overall thickness as the wall. Since the movement of air transversely through the module 1 is very slow the areas of conduits 51–54 need not be large. The foot 46 of the quadripartite conduit 40 resting on septa 15 and 16 covers and seals the top of bin 6. The septum member 47 and the foot 46 of the said quadripartite conduit are thick to accomodate roof loads. The bulkheads 41 and 45 are reinforced by tapering as shown for transverse and load bearing strength. The septa 42 and 44 carry little load and are spaced and tapered to equalize the areas of channels 51–54 and for handling strength. The quadripartite conduit is made of non-porous composite fiber strengthened plastic having low thermal conductivity.

Figure 5:
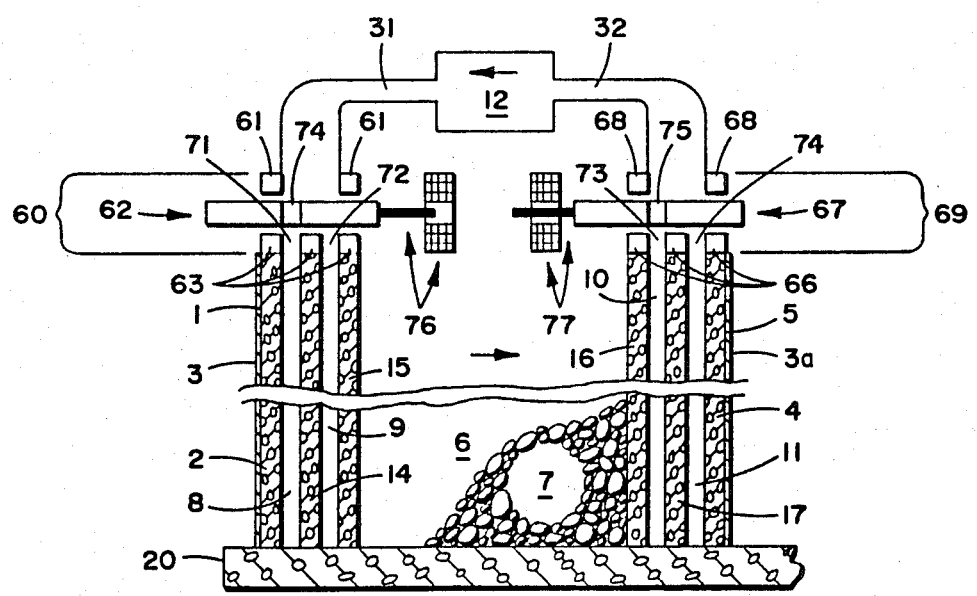
FIG. 5 is a cross section of a wall with a superposed schematic diagram of valve assemblies and their solenoid operators, circulating fan, and air passages.

FIG. 5 is cross section of a wall composed of a module 1 and a circuit diagram showing how air may be switched from one duct to another as between the configurations shown in FIGS. 2 and 3. In FIG. 2 the passage 31 is shown concatenated with duct 8 for simple explanation. In FIG. 5 the valve 60 is shown interposed between passage 31 and duct 8 and the valve 69 is shown interposed between duct 10 and passage 32 whereby air circulation may be changed to permit management of energy transfer between structure components. Again in FIG. 5, air from the fan 12 is discharged through the passage 31 to the valve 60. Intake port 61 of the valve 60 spans both exit ports 71 and 72. The valve slide 62 is shown providing entrance through its central orifice 74 to exit port 71 while closing exit port 72, allowing air to pass into duct 8, thence transversely through septa 14 and 15, the gravel 7, and septum 16 into duct 10 whence it passes into the entrance port 73 of the intake section 66 of valve 69. The slide 67 of the valve 69 has a central orifice 75, shown in position to seal duct 11 and intake port 74 while permitting air to pass from duct 10 to the exit port 68 which spans both intake ports 73 and 74. The air then returns through the passage 32 to the fan 12. Functions provided by various combinations of positions of the slide orifices 74 and 75 are shown in FIGS. 2 and 3 and also in manners described hereinafter.

It is not to be considered that the conditions shown in FIGS. 2 and 3 are to be limited to the times mentioned in the paragraphs devoted to the said figures. Various outside wall and roof sections are exposed in many directions and to various interruptive mechanisms such a buildings, trees and clouds and to energy from reflective surfaces such as sidewalks. Frequent shifts of mode will be made in each wall and roof section, when controlled by valves in the same manner as in conventional sectionalized and thermostatically controlled heating and air conditioning systems. It should be noted that no energy collection, disposal or storage means external to the modules is required.

At certain times small differences of temperature exist between interior surfaces and exterior surfaces and little need is forseen to store energy in or remove energy from the gravel. During these times energy may be transferred directly from the surface and element of higher temperature to the element and surface of lower temperature. Referring again to FIG. 5, the central orifice 75 of valve 69 may then be moved to connect duct 11 to passage 32 as shown in FIG. 3 but not otherwise illustrated. The fan 12 then blows air through the passage 31 as shown in FIG. 2 into the duct 8, transversely through septa 14 and 15, the gravel 7, septa 16 and 17 into the duct 11, and through the passage 32 to the fan 12.

When no means of artificially raising or lowering the temperature of the circulating air is provided, all energy transfers discussed hereinbefore occur from elements of higher temperature to elements of lower temperature, wherever in the circuit of the then used mode these elements may be located. Addition of an electric heater in the passage 31 provides special heating for emergencies. Provision of especially cooled elements would be more difficult because of the number of sections of walls and/or roof comprising a building.

The valves and their associated operating mechanisms are unitized within a housing between the fan and the quadripartite conduit. In response to computer generated signals the slides 62 and 67 of the valves 60 and 69 are repositioned by the linear motors shown in FIG. 5 as bi-directional solenoid actuators 76 and 77.

Walls are sectioned into reasonable lengths and between those facing different directions, or those shaded at certain times of day. Roofs may also be sectioned. Each section has its own complete air circulation system and is separately controlled.

Thermal sensors on the exterior and interior surfaces of the wall sections report conditions to a simple computer which is programmed to adjust the valve positions and to control the fan. A single computer serves all sections of a building.

Extruded blocks, columns and beams may be made in any width appropriate for machine placement. Conventional lift slab surface treatments with absorptive and radiative colors may be added. Internal webs may be added wherever needed for handling strength. Being permeable they will not interfere with air flow.

Roof modules are made in the same way as wall structures except that the inside elements may be much thicker and contain prestressing wires, rods or cables to enable them to support their own considerable weight and any forseeable superposed loads. These roofs may provide the total energy management capability required. In these cases, conventional load bearing walls may be used. Bins may be prefilled and sealed. Quadripartite conduits close one end of the roof structures, while caps, either precast or cast in place, close the other end.

A separate air circulation system within a room may require a fan to match the room air temperature to that of controlled temperature surfaces. Alternatively, if roofs are not made of modules as taught herein they may be insulated and provided with suspended ceilings. The space therebetween may then be included in the room air circulation system. Floors may also be included in the room air circulation system. Hadite blocks laid on their sides form continuous ducts through the floor. Room air may be circulated therethrough to maintain comfortable floor temperature. Filled with colored portland cement, ground as terrazzo and waxed these floors have proven very pleasant and durable. Vertically furred inner wall spaces may be connected to the floor ducts and roof-ceiling space to further equalize the temperature of all interior surfaces. This literally forms a room within a room. This provides equal thermal exchanges between occupants and interior surfaces thereby providing maximum comfort. Additionally, it may provide ambient air of the same temperature as that of all interior surfaces.

Wall and roof modules storing energy thus required are, by today's standards, unusually thick. This opens many architectural opportunities. The designs of adobe and sandstone buildings may well be re-adopted and elaborated.

Having now described my invention in detail in its several parts, embodiments and systems and having illustrated them in the accompanying drawings, it will be understood that the invention is not limited to the embodiments disclosed, but is capable of numerous rearrangements, modifications and substitutions, obvious to anyone familiar with the field or skilled in its arts, without departing from the scope of the invention. Common modifications and substitutions in valves, valve actuators, temperature sensors, thermostats and computers are available to anyone familiar with the art or technology. Inclusion of single embodiments of any of these has been made only for purposes of explanation.

I claim as my invention:

1. A building element comprising:

two spaced apart vertical side walls being substantially parallel and co-extensive;

a vertical outside wall having an outwardly facing surface exposed to an outdoor environment;

a vertical inside wall being substantially parallel to and co-extensive with said outside wall, and having an outwardly facing surface exposed to an inside space of a building;

four vertical inner walls being parallel to and disposed between said outside and inside walls;

said outside wall and said first inner wall being spaced apart to define a first duct;

said first and second inner walls being spaced apart to define a second duct;

said second and third inner walls being spaced apart to define a heat storage bin;

said third and fourth inner walls being spaced apart to define a third duct;

said fourth inner wall and said inside wall being spaced apart to define a fourth duct;

said side walls being integrated with said outside, inside and inner walls for support of each end of said inner walls;

said heat storage bin being filled with a granular heat storage material for the storage of heat; and impermeable fibrous mastic coatings on the outwardly facing surfaces of said outside and inside walls, to prevent the passage of air therethrough.

2. The building element recited in claim 3 including:

a horizontal lower support wall extending from said outside to said inside wall for sealingly closing the lower ends of said first, second ducts, said heat storage bin, and said third and fourth ducts;

a circulation duct having a first and second outlet;

said first outlet being connected to a first valve for selectively communicating said first outlet with either said first or second duct and for sealingly closing the unconnected said second or first duct;

said second outlet being connected to a second valve means for selectively communicating said second outlet with either said third or fourth duct and for sealingly closing the unconnected said fourth or third duct; and fan means disposed in said circulation duct for selectively circulating air through said first and second ducts, said inner walls, said heat storage bin, and said third and fourth ducts for the storage and transfer of heat.

* * * * *

UNITED STATES PATENT AND TRADEMARK OFFICE
CERTIFICATE OF CORRECTION

PATENT NO. : 4,526,225

DATED : July 2, 1985

INVENTOR(S) : Austin N. Stanton

It is certified that error appears in the above-identified patent and that said Letters Patent is hereby corrected as shown below:

The title page and Figure 5, should appear as shown on the attached sheets.

Column 3, line 28, delete "a".

Column 3, line 67, "74" should read -- 70 --.

Column 3, line 67, after "71" insert -- of exhaust section 63. --.

Column 6, line 33, "3" should read -- 1 --.

Signed and Sealed this

Twenty-sixth Day of November 1985

[SEAL]

Attest:

DONALD J. QUIGG

Attesting Officer

Commissioner of Patents and Trademarks

United States Patent [19]
Stanton

[11] Patent Number: 4,526,225
[45] Date of Patent: Jul. 2, 1985

[54] BUILDING ELEMENT FOR HEAT STORAGE AND TRANSFER

[76] Inventor: Austin N. Stanton, 3017-15 Stonehenge La., Carrollton, Tex. 75006

[21] Appl. No.: 552,399

[22] Filed: Nov. 16, 1983

Related U.S. Application Data

[63] Continuation of Ser. No. 306,313, Sep. 28, 1981, abandoned.

[51] Int. Cl.³ ............................................. F28D 13/00
[52] U.S. Cl. ............................ 165/104.11 A; 126/400; 165/53; 165/101
[58] Field of Search ............ 126/400, 430, 431, 436; 165/48.5, 53, 101, 104.11 A

[56] References Cited

U.S. PATENT DOCUMENTS

| 3,980,130 | 9/1976 | Thomason et al. | 126/435 X |
| 4,180,350 | 1/1980 | Staudacher | 126/430 |
| 4,231,351 | 11/1980 | Pheils, Jr. | 126/427 X |
| 4,250,871 | 2/1981 | Milburn, Jr. | 165/104.11 X |
| 4,257,481 | 3/1981 | Dobson | 126/436 X |
| 4,286,575 | 9/1981 | Gates | 126/430 X |
| 4,303,058 | 12/1981 | Chun | 126/430 |
| 4,324,289 | 4/1982 | Lahti | 126/430 X |
| 4,338,918 | 7/1982 | Milburn, Jr. | 126/435 X |
| 4,350,200 | 9/1982 | McElwain | 126/430 X |

FOREIGN PATENT DOCUMENTS

| 28800 | 5/1981 | European Pat. Off. | 126/431 |
| 49669 | 4/1982 | European Pat. Off. | 126/430 |
| 2322260 | 11/1974 | Fed. Rep. of Germany | 165/53 |

Primary Examiner—Stephen F. Husar

[57] ABSTRACT

Structures fabricated from modules of permeable concrete provide heat storage and transfer capability. Such structures derive solar energy directly, store it within the modules for future use in a building, or it can withdraw heat from a building and dispose of it to the sky with little utility derived energy. After erection without mortar both surfaces are coated with fiber filled mastic for strength and to enclose an air circulation system. Each module has a central bin filled with gravel and two planar ducts between each end and the central bin. Air injected into the first, from the outside end, duct removes heat from the surface, distributes the heat by uniform transverse flow to warm the gravel and exits through the third duct. Similarly, at useful times, it removes heat from the gravel and warms the interior surface. At other times and by the same process heat is removed from the interior surface and stored; later it is transferred to the exterior surface and radiated into space. Auxiliary sensors, valves, actuators, fans, conduits and a computer are provided for. Under most conditions no energy collection, disposal or storage means external to the modules is required.

2 Claims, 5 Drawing Figures

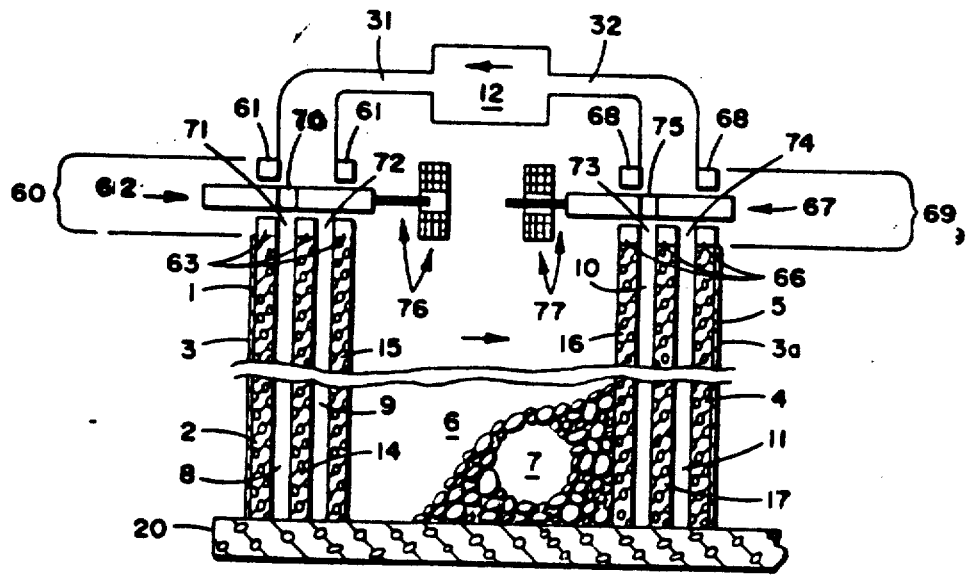

UNITED STATES PATENT AND TRADEMARK OFFICE
CERTIFICATE OF CORRECTION

PATENT NO. : 4,526,225

DATED : July 2, 1985

INVENTOR(S) : Austin N. Stanton

Page 3 of 3

It is certified that error appears in the above-identified patent and that said Letters Patent is hereby corrected as shown below:

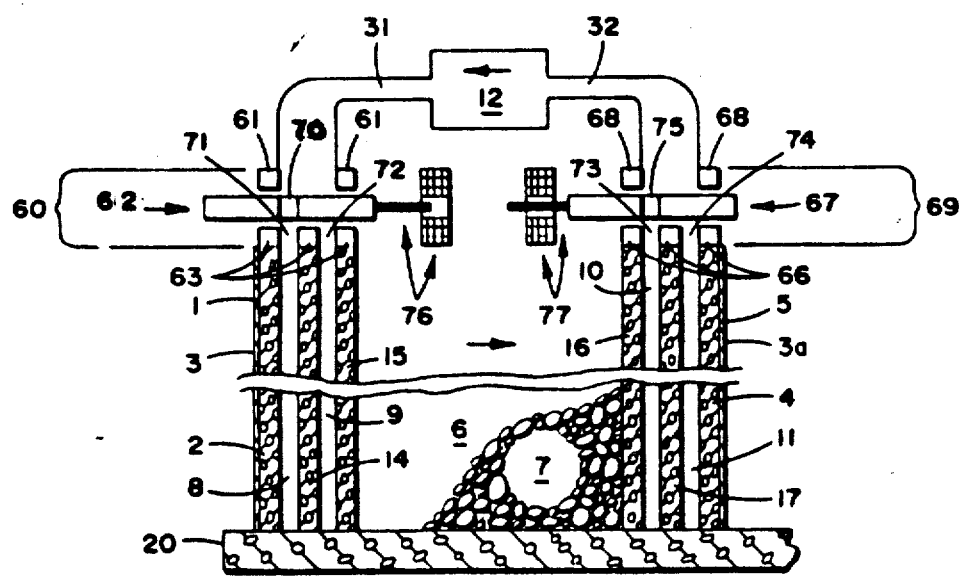

FIG. 5